United States Patent [19]

Muth

[11] Patent Number: 4,476,492

[45] Date of Patent: Oct. 9, 1984

[54] DEVICE FOR LINEARLY GUIDING A SCANNER

[75] Inventor: Karl-Heinz Muth, Lollar, Fed. Rep. of Germany

[73] Assignee: Ernst Leitz Wetzlar GmbH, Wetzlar, Fed. Rep. of Germany

[21] Appl. No.: 407,487

[22] Filed: Aug. 12, 1982

[30] Foreign Application Priority Data

Sep. 5, 1981 [DE] Fed. Rep. of Germany ....... 3135180

[51] Int. Cl.[3] .......................... H04N 3/02; H04N 3/08

[52] U.S. Cl. ...................................... 358/208; 358/199

[58] Field of Search ................ 358/199, 285, 293, 208; 250/234

[56] References Cited

U.S. PATENT DOCUMENTS 2,911,470 11/1959 Greenleaf et al. .................. 358/208

3,891,299 6/1975 Rushing .......................... 358/208 X 3,952,217 4/1976 Rawlings ........................ 358/208 X

*Primary Examiner*—John C. Martin

*Assistant Examiner*—Victor R. Kostak

*Attorney, Agent, or Firm*—Schwartz, Jeffery, Schwaab, Mack, Blumenthal & Koch

[57] ABSTRACT

A device for effecting exact scanning of an object along a path extending in a predetermined coordinate direction has two rigidly connected drivers acting in opposite directions with respect to each other. One of the drivers is operatively connected to impart oscillating motion to a scanner carrier suspended on springs, and the other driver is connected to impart oscillating motion to a counterweight suspended on springs, with the weight of the counterweight being substantially equal to the scanner carrier plus the scanner. The guiding device also has a control circuit for controlling the movements of the scanner carrier and counterweight to be in opposite directions so as to counterbalance dynamic movements in the scanning device. Linear guide elements are provided guiding the scanner carrier and means are provided for laterally displacing the scanning line of the scanner.

13 Claims, 6 Drawing Figures

DEVICE FOR LINEARLY GUIDING A SCANNER

BACKGROUND OF THE INVENTION

The present invention relates to a device for linearly guiding a scanner along a path extending in a predetermined coordinate direction, for example in optical instruments.

It is known in the scanning of objects to fasten the objects themselves or suitable sensors to a carrier mounted on two deflection springs of equal length arranged parallel to each other, one behind the other in the oscillating direction, with one end of each of the springs immobilized in a clamping plane and the other end of each spring connected to the carrier (Hildebrand: "Structural Elements for Precision Mechanics", 3rd Edition, VEB Verlag Technik Press, Berlin, p. 266 ff).

As the springs deflect, the carrier moves parallel to the base or clamping surface to which the springs are attached. However, the movement of the carrier corresponds to a circular curve around the clamping points, so that the carrier is displaced (Hildebrand: "Structural Elements for Precision Mechanics", 3rd Edition p. 410).

If such a scanner is used, for example, for determining measuring points or for determining the center of scale marks, then no disadvantage arises from the circular movement of the scanner. Such circular scanner movement is disadvantageous, however, when these scanners are utilized in conjunction with image-forming devices, such as television and camera systems. In order to be able to produce a true image of the scanned object from the electrical signal derived from the scan, it would be necessary to also guide the electrons or light beam which generate the image along a circular curve corresponding to the curve followed by the oscillator of the scanner. This, however, would involve a great deal of expense and cause problems in signal evaluation.

A further disadvantage of such scanners is transmission to the device of oscillations which interfere with the function of the device. Such interfering oscillations arise during the oscillations of the scanner as a result of the simultaneous acceleration or deceleration of all moving parts in the same direction and as a result of the rapidly changing direction of movement which occurs as a function of the frequency of oscillation.

SUMMARY OF THE INVENTION

Accordingly, it is the object of the present invention to provide an improved device for guiding a scanner along a linear path.

A further object of the invention is to provide a device for linearly guiding a scanner in which no dynamic forces are transmitted to the device as a result of the movement of the scanner.

Another object of the invention is to provide a device for linearly guiding a scanner which is suitable for use with television or camera systems.

Additionally, it is an object of the present invention to provide a device for linearly guiding a scanner which will reduce image distortion in optical devices.

It is also an object of the present invention to provide a device for linearly guiding a scanner which avoids transmission of oscillations which interfere with the functioning of the device.

These and other objects of the invention are achieved by providing a device for linearly guiding a scanner along a path extending in a predetermined coordinate direction, and said device comprising two drive means rigidly connected with each other and operating in opposing directions, one of said drive means being operatively connected to impart oscillating motion to a scanner carrier suspended on springs, and the other of said drive means being operatively connected to impart oscillating motion to a counterweight suspended on springs, the weight of said counterweight being at least substantially equal to the weight of the scanner carrier plus the scanner, said device further comprising control means for actuating said drives so that the motion of said scanner carrier and the motion of said counterweight produced by said drives are always in opposing directions, and means for laterally displacing the scanning line of said scanner.

In preferred aspects of the invention, distance measuring systems are associated with the scanner carrier, with the counterweight and with the lateral displacement means for determining the degree of displacement of each. The amplitude of the oscillations of the scanner carrier and/or counterweight may be adjusted by the appropriate control means based on such distance measurements. Control means may also be provided to effect step-by-step lateral movement of the scanner during the reversal of the direction of movement of the oscillations.

In another preferred aspect of the invention, a guide means or guide element is provided for guiding the scanner carrier comprising two leaf springs of equal length joined to opposite sides of the scanner carrier by pivotable joints.

In a further preferred aspect of the invention, a guide means are or guide element is provided for guiding the movement of the scanner carrier comprising two leaf springs of different lengths pivotably joined to the same side of the scanner carrier.

In yet another preferred aspect of the present invention, a guide means or guide element for guiding the movement of the scanner carrier is provided comprising four leaf springs of equal length arranged in the form of a parallelogram with the scanner carrier and the counterweight disposed at two diagonally opposite corners of the parallelogram and with two intermediate carriers disposed at the other two diagonally opposite corners of the parallelogram; the two drive means being operatively connected to and acting in opposing directions on said intermediate carriers; said guide means being supported on two further leaf springs with one end of each support spring being attached to a stationary point and the other end of each support spring being attached to one of said intermediate carriers.

BRIEF DESCRIPTION OF THE DRAWINGS

The invention will be described in further detail with reference to the accompanying drawings, wherein.

DETAILED DESCRIPTION OF PREFERRED EMBODIMENTS

Figure 1:
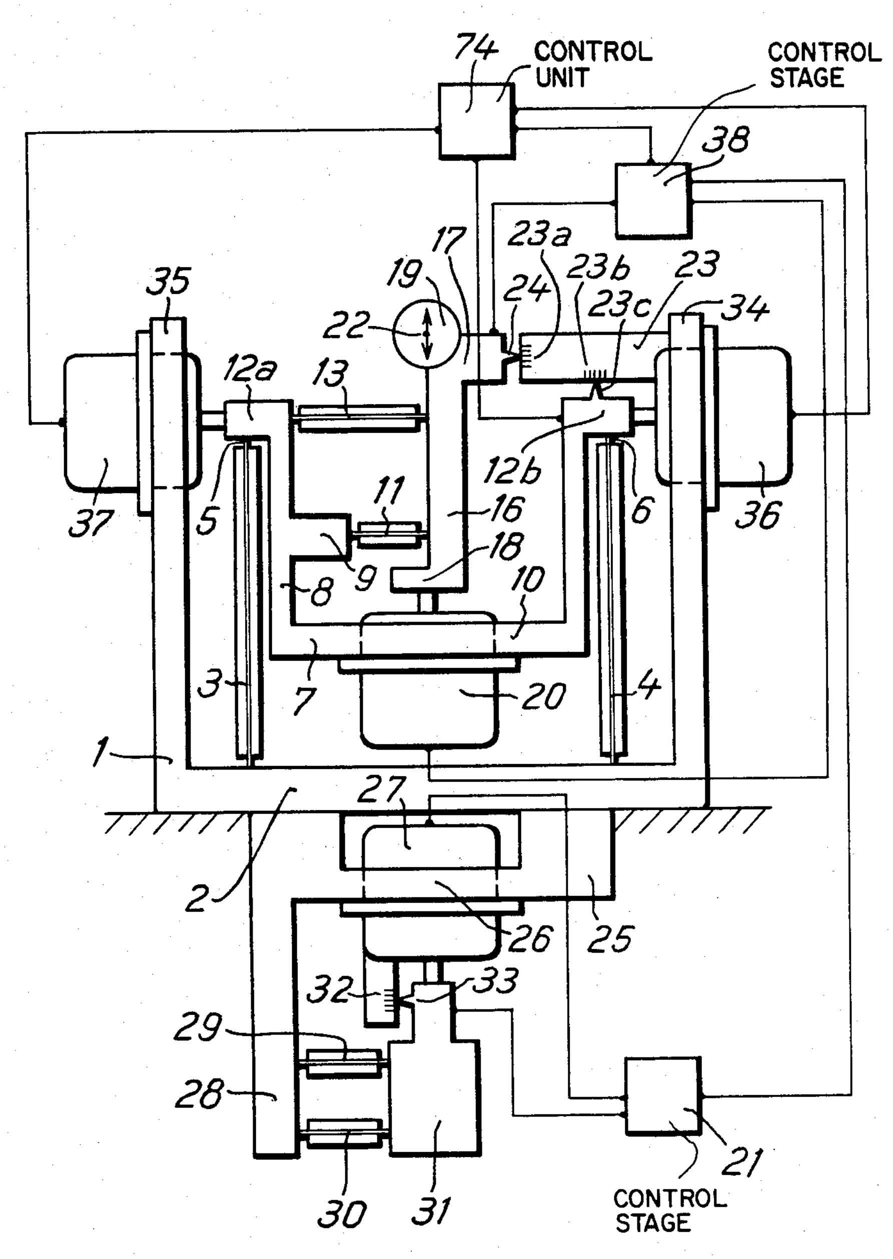
FIG. 1 shows a device with guide elements attached to the same side of the carrier for guiding the scanner carrier along a straight path.

FIG. 1 shows schematically a U-shaped carrier 1 having a base 2 to which two centrally reinforced leaf springs 3 and 4 are attached. Leaf springs 3 and 4 are arranged in the form of an articulated rectangle and carry on their ends 5 and 6 a frame 7 having the form of a double Z. One arm 8 of the frame 7 is provided in its approximate center with a reinforcement 9, which receives a leaf spring 11 extending parallel to the base 10 of frame 7. Leaf spring 11 forms a guide element together with centrally reinforced leaf spring 13 which is fastened to the frame end 12*a*. The ends of leaf springs 11 and 13 are pivotably connected to a scanner carrier 16, with the ends 17 and 18 of the scanner carrier extending past the points of articulation. End 17 of scanner carrier 16 carries a sensor 19 while end 18 is connected positively or tensionally with a first drive 20 which is mounted on base 10 of frame 7. Alternatively, the sensor may be stationary and the object to be scanned may be mounted on the carrier.

By suitably selecting the lengths of the leaf springs 11 and 13 (as shown) and suitably selecting the relative positions of their points of articulation, the scanner carrier 16 oscillates when drive 20 is actuated by a control stage 38 and guides the sensor 19 along a straight path indicated by the double arrow 22. The magnitude of the oscillating amplitude of the guide element is adjustable. For this purpose, scanner carrier 16 is associated with a distance measuring system which is indicated by a scale carrier 23 bearing a scale 23*a* and a pointer 24 mounted on scanner carrier 16.

In order to prevent generation of oscillations which interfere with the function of the device, the device is equipped with means for producing an equalization of the dynamic mass. A support bridge 25 is mounted on the carrier 1, and a second drive 27 is arranged in the middle of the support bridge. On an extended pier 28 of support bridge 25, a counterweight 31 is suspended from a parallelogram guide formed by centrally reinforced springs 29 and 30. The mass of counterweight 31 corresponds to the weight of the scanner carrier 16 plus the sensor 19, and the counterweight is operatively connected to the second drive 27. Second drive 27 is actuated by control stage 21. A circuit layout contained in the control stages 21 and 38, but not shown in the drawing, controls the drives 20 and 27 in such a way that the movements they produce are always opposite in direction.

The oscillating amplitude of counterweight 31 may be regulated by means of a distance measuring system which is indicated by a scale 32 mounted on second drive 27 and a pointer 33 attached to counterweight 31.

In order to facilitate step-by-step advancement of the scanner carrier 16 perpendicular to its oscillating motion, additional drive units 36 and 37 are mounted on the free arms 34 and 35 of carrier 1. Drive units 36 and 37 act on the ends 12*a* and 12*b* of the frame 7 supported by the leaf springs 3 and 4 which form an articulated rectangle. Drive units 36 and 37 cause the frame to move laterally, perpendicular to the oscillations of the scanner carrier 16.

The drive units 36 and 37 are actuated by control unit 74. The magnitude of the lateral movement of the scanner carrier may be regulated by a distance measuring system which is indicated by an instrument pointer 23*c* mounted on frame end 12*b* and an additional scale 23*b* on the scale carrier 23. The movements of the drives 36 and 37 are directed by the control device 74 in the same direction.

As a result of the suspension of the frame 7 on the leaf springs 3 and 4, the lateral motion takes place on a circular curve. The distance measuring system 23*a*, 24 is used to correlate the operating range of the sensor 19 during lateral displacement of its scanning line 22 with the desired or theoretical position defined by the object field.

Furthermore, as a result of the operative connection of the control units 38 and 74, the actuation of the drive units 36 and 37 takes place when the scanner carrier 16 is outside of its operating range defined by the region of uniform velocity of its movement, i.e. when the scanner carrier 16 is at the reversing point of the oscillating motion.

Figure 2:
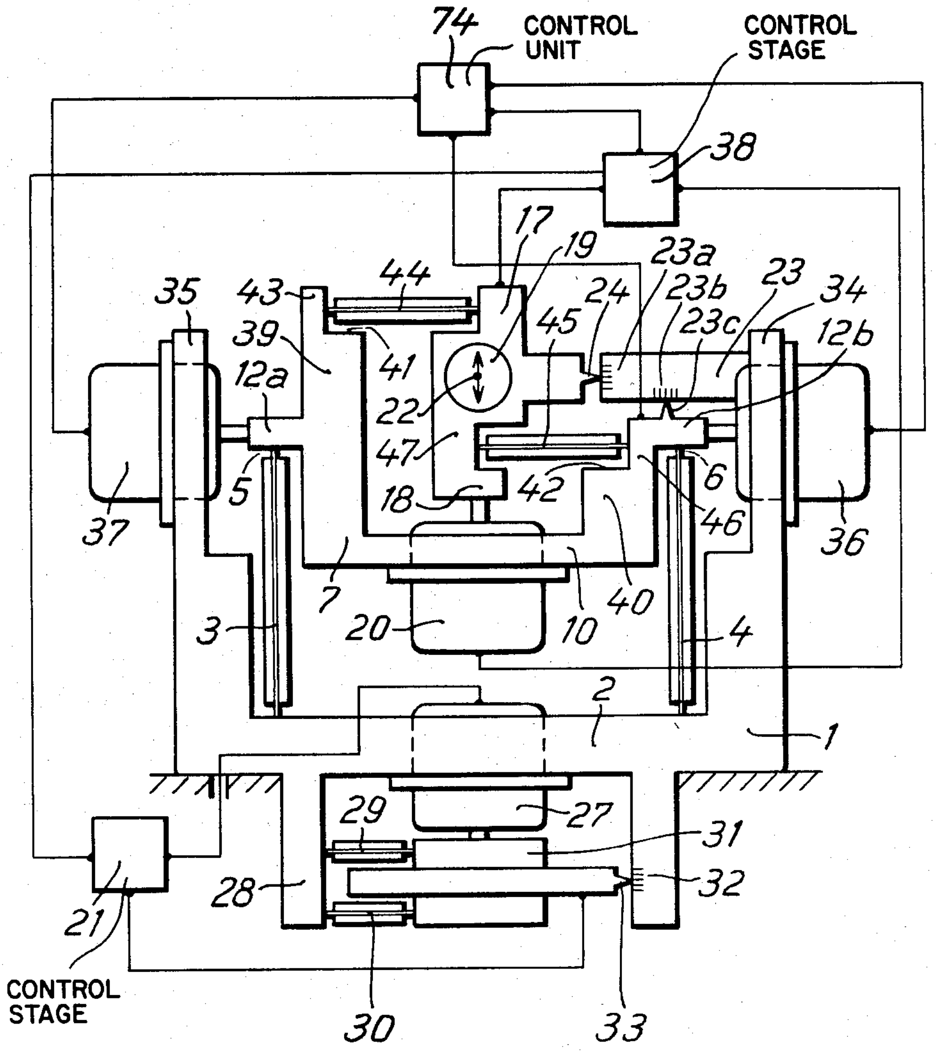
FIG. 2 illustrates a device with guide elements attached to opposite sides of the carrier for guiding the scanner carrier along a straight path.

The device shown schematically in FIG. 2 differs from the device of FIG. 1 in that it has a more compact construction and uses a variant form of guide element for guiding the scanner carrier 16 along a straight path. The more compact construction is obtained by setting the drive 27 for the counterweight 31 into the base 2 of the U-shaped carrier 1 and moving the sensor 19 to a position between the leaf springs 44 and 45 of the guide element.

In this case, the frame 7 connected by pivotable joints to the centrally reinforced leaf springs 3 and 4 has a long arm 39 and a short arm 40. Both arms are provided with step-like recesses 41 and 42. At the end 43 of the arm 39, a reinforced leaf spring 44 is mounted extending toward the arm 40 parallel to the base 10 of the frame 7. A centrally reinforced leaf spring 45 of equal length is arranged to lie in the same plane at the end 46 of short arm 40. The free ends of the leaf springs 44 and 45 are movably connected with a scanner carrier 47 and form together with the carrier a known type of guide element. Scanner carrier 47 supports the sensor 19.

As described in connection with FIG. 1, the guide element is oscillated by the drive 20, and its oscillating amplitude is regulated using measuring system 23*a*, 24. The equalization of dynamic mass, the advancement of the scanner carrier perpendicular to the direction of oscillation, and the control of drives 20, 27, 36 and 37 to effect the lateral advance movement take place as described with regard to the device of FIG. 1.

Figure 3:
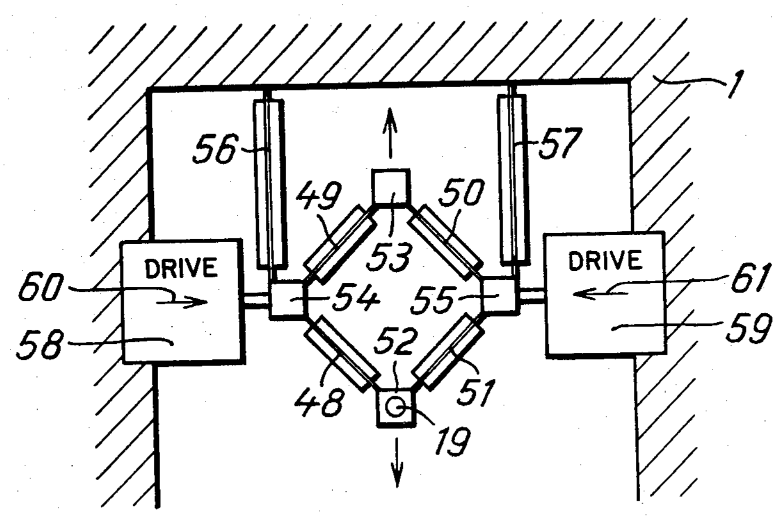
FIG. 3 is a detail view of a preferred guide element embodiment.

A guide element permitting an especially compact construction of the device is illustrated in FIG. 3. It comprises four centrally reinforced leaf springs 48, 49, 50, 51 of equal length, which form the guide and are arranged in the form of a parallelogram. The guides (springs) 48 to 51 connect a scanner carrier 52 provided with a sensor 19 and a counterweight 53 in one pair of diagonally opposite corners of the parallelogram and intermediate carriers 54 and 55 in the other pair of diagonally opposite corners. Intermediate carriers 54 and 55 are each suspended on a centrally reinforced leaf spring 56 and 57, respectively. The drives 58, 59 always act in opposing directions on the intermediate carriers 54 and 55 as indicated by the arrows 60 and 61 and produce the movement of the scanner carrier 53, whereby the movements of the intermediate carriers are always in opposing directions.

Figure 4:
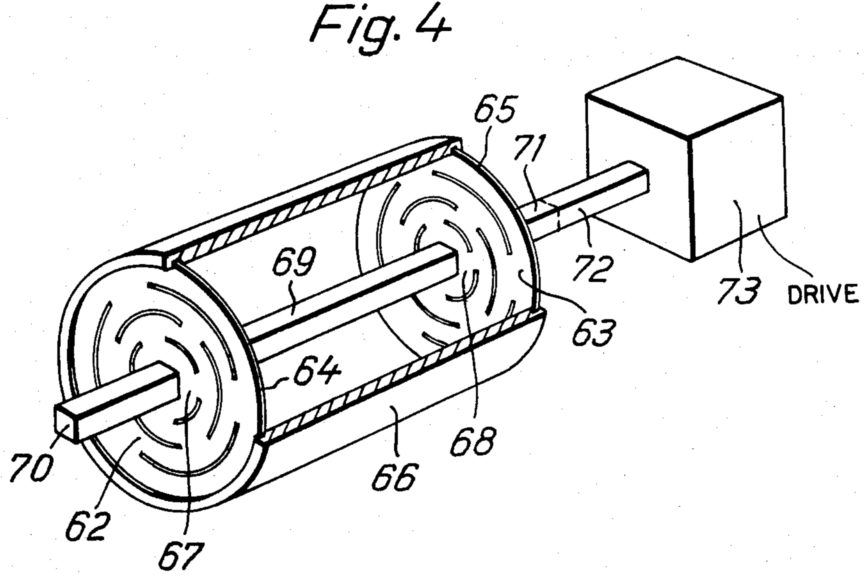
FIG. 4 is a perspective view of a scanner carrier guided along a straight path by membrane springs.

It is also possible to guide the scanner carrier along a straight path by means of slit membrane springs. In the illustrative embodiment shown in FIG. 4, the edges 64 and 65 of two membrane springs 62 and 63 are clamped in a cylindrical holder. The centers 67 and 68 of the membrane springs are connected by a scanner carrier 69 which extends past the membrane springs 62 and 63 on both sides. The scanner carrier 69 is contained in a housing 66. One end 70 of the carrier serves to guide a sensor 19, not shown in the drawing, while the other protruding end 71 is operatively connected with a push rod 72 of a drive 73.

Configurations for the distance measuring systems with path limiting means (23*a*, 24, 23*b*, 23*c*, 32, 33) illustrated in FIGS. 1 and 2 and described in the specification as well as for the necessary control means (21, 38) are known in the art.

Figure 5:
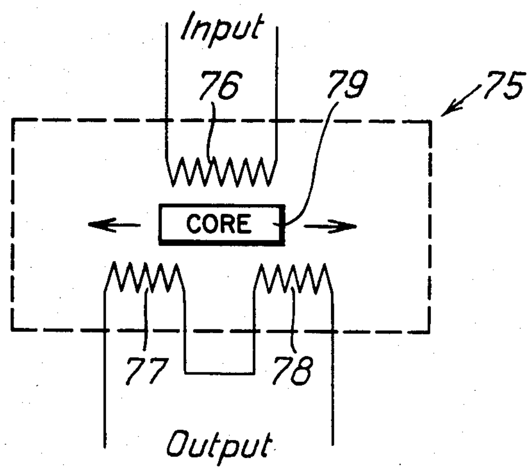
FIG. 5 is a schematic diagram of a distance measuring system sensor.
Figure 6:
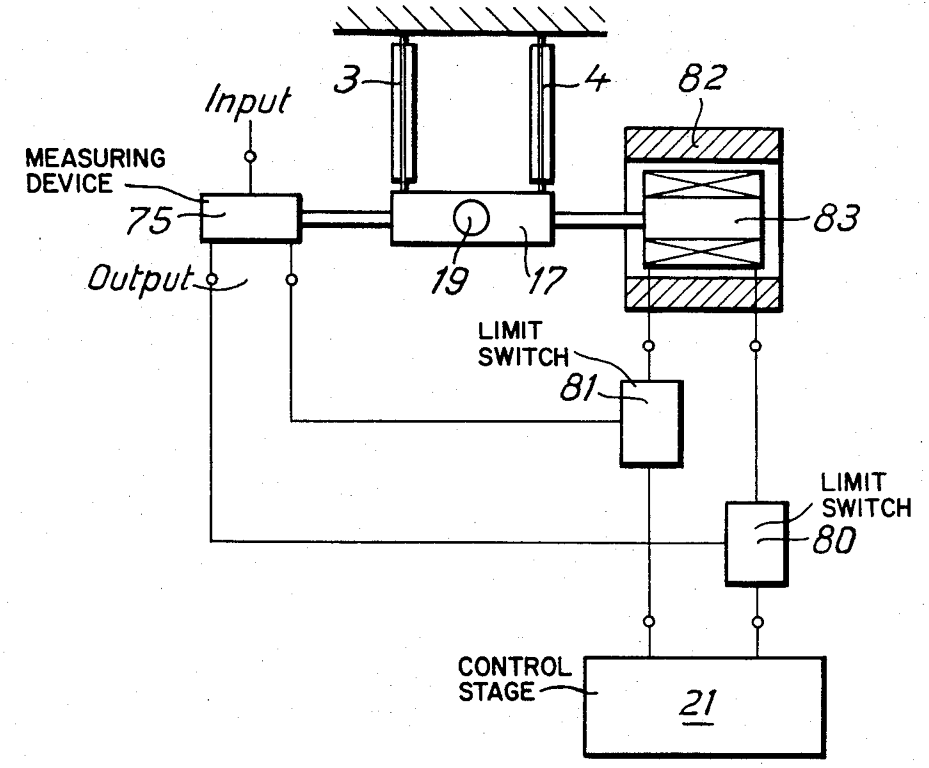
FIG. 6 is a circuit diagram for a distance measuring system with distance limits.

As an example, reference is made to an inductive distance measuring device 75, (LVDT Model 050 DC-D manufactured by ALTHEN) shown in diagrammatic form in FIG. 5 which works according to the differential transformer principle and has built-in electronic controls. The built-in electronic controls (not shown) contain an oscillator, a demodulator and an amplifier, and enable operation of the distance measuring device 75 without additional external electronics. The input of a primary coil 76 is obtained from a source of direct current, not shown. The output of the secondary coils 77 and 78 is obtained in the form of a dc current depending on the position of the sliding core 79. In the center position of the sliding core 79, the voltage assumes the value of 0. At the maximum displacement of the sliding core 79, the output reaches a maximum value. The path of the sliding core 79 and the output voltage are related linearly to each other; i.e. a change of a predetermined magnitude occurs in the voltage for each 1/10 mm change in the position of the sliding core along the path. The output voltage which stands in fixed relation to the position of the sliding core is used to control the drives 20, 27, 36, 37 by means of limit switches or trigger switches 80, 81 (FIG. 6). For example, plunger coil vibrators 82 (manufactured by KONTRON) as shown in FIG. 6 which consist essentially of a permanent magnet 82 and a plunger coil 83 may be used as the drives.

The foregoing description has been set forth merely to describe illustrative embodiments of the invention and is not intended to be limiting. Since modifications of the described embodiments incorporating the spirit and substance of the invention may occur to persons skilled in the art, the scope of the invention is to be limited solely with respect to the appended claims and equivalents.

I claim:

1. A device for linearly guiding a scanner along a path extending in a predetermined coordinate direction, said device comprising two drive means operating in opposing directions and rigidly connected with each other; one of said drive means being operatively connected to impart oscillating motion to a scanner carrier suspended on springs and bearing said scanner, the other drive means being operatively connected to impart oscillating motion to a counterweight suspended on springs, the weight of said counterweight being substantially equal to the weight of said scanner carrier plus said scanner; said device further comprising control means for actuating said drive means so that the oscillating movements of said scanner carrier and of said counterweight produced by said drive means are always in opposing directions, and means for laterally displacing said scanner.

2. A device according to claim 1, comprising guide means for guiding said scanner carrier.

3. A device according to claim 2, wherein said guide means comprises two leaf springs of equal length operatively connected to opposite sides of said scanner carrier by pivotable joints.

4. A device according to claim 2, wherein said guide element comprises two leaf springs of different lengths pivotably joined to the same side of said scanner carrier.

5. A device according to claim 2, wherein said guide means comprises four leaf springs of equal length arranged in the form of a parallelogram, said leaf springs connecting the scanner carrier bearing the scanner and a counterweight at opposite corners from each other diagonally across the parallelogram, and said leaf springs further connecting two intermediate carriers located at the other corners of said parallelogram diagonally across from each other; said two drive means acting in opposing directions being operatively connected to said intermediate carriers.

6. A device according to claim 5, further comprising means for supporting said guide means comprising two additional leaf springs, one end of each of said additional leaf springs being connected to a fixed point, and the other end of each of said additional leaf springs being connected to one of said intermediate carriers.

7. A device according to claim 2, wherein said means for guiding said scanner carrier comprises a pair of spaced, parallel membrane springs.

8. A device according to claim 1, further comprising a distance measuring system associated with said scanner carrier.

9. A device according to claim 1, further comprising a distance measuring system associated with said means for laterally displacing said scanner.

10. A device according to claim 1, further comprising a distance measuring system associated with the drive means operatively connected to said counterweight.

11. A device according to claim 8, wherein said distance measuring system associated with said scanner carrier is part of a control device which—utilizing limiting means—correlates the operating range of said scanner during lateral displacement of the scanning line of said scanner with the theoretical position defined by the object field.

12. A device according to claim 1, wherein said control means comprises an electronic circuit for producing a signal linearly related to the oscillating movements of the scanner carrier and of the counterweight.

13. A device according to claim 1, further comprising additional control means for actuating said means for lateral displacement of said scanner when the scanner carrier is outside of its operating range defined by the region of movement of said scanner carrier at a uniform velocity.

* * * * *